United States Patent
Momchilov et al.

(10) Patent No.: US 11,128,676 B2
(45) Date of Patent: Sep. 21, 2021

(54) CLIENT COMPUTING DEVICE PROVIDING PREDICTIVE PRE-LAUNCH SOFTWARE AS A SERVICE (SAAS) SESSIONS AND RELATED METHODS

(71) Applicant: CITRIX SYSTEMS, INC., Fort Lauderdale, FL (US)

(72) Inventors: Georgy Momchilov, Parkland, FL (US); Jeroen Mattijs Van Rotterdam, Fort Lauderdale, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 66 days.

(21) Appl. No.: 16/385,117

(22) Filed: Apr. 16, 2019

(65) Prior Publication Data

US 2020/0336514 A1 Oct. 22, 2020

(51) Int. Cl.
| | | |
|---|---|---|
| *G06F 15/16* | (2006.01) | |
| *H04L 29/06* | (2006.01) | |
| *H04L 29/08* | (2006.01) | |
| *G06F 3/0483* | (2013.01) | |

(52) U.S. Cl.
CPC ........ *H04L 65/1069* (2013.01); *G06F 3/0483* (2013.01); *H04L 65/1063* (2013.01); *H04L 67/02* (2013.01); *H04L 67/10* (2013.01); *H04L 67/42* (2013.01)

(58) Field of Classification Search
CPC . H04L 65/1069; H04L 65/1063; H04L 67/02; H04L 67/10; H04L 67/42; G06F 3/0483
See application file for complete search history.

(56) References Cited

U.S. PATENT DOCUMENTS

| | | | |
|---|---|---|---|
| 8,578,076 B2 | 11/2013 | van der Linden et al. | |
| 8,726,343 B1 | 5/2014 | Borzycki et al. | |
| 8,990,699 B2* | 3/2015 | Pugh | G06F 21/105 |
| | | | 715/738 |
| 9,176,744 B2 | 11/2015 | Lee | |
| 9,538,345 B2 | 1/2017 | Sah et al. | |
| 2009/0132579 A1* | 5/2009 | Kwang | H04L 67/22 |
| 2011/0277027 A1* | 11/2011 | Hayton | H04L 63/0815 |
| | | | 726/8 |
| 2012/0054625 A1* | 3/2012 | Pugh | H04L 63/0815 |
| | | | 715/736 |
| 2014/0258884 A1* | 9/2014 | Bank | H04L 65/403 |
| | | | 715/753 |

(Continued)

*Primary Examiner* — Razu A Miah
(74) *Attorney, Agent, or Firm* — Allen, Dyer, Doppelt + Gilchrist, PA

(57) ABSTRACT

A client computing device may include a memory and a processor cooperating with the memory to run a first Software as a Service (SaaS) application session from a server for a first SaaS application within an embedded browser and viewable within a user interface (UI). The processor may further pre-launch a second SaaS application from the server different than the first SaaS application within the embedded browser based upon browser commands within the first SaaS application session. The second SaaS application session may be hidden so that it is not viewable within the UI. Upon user selection of the second SaaS application, the processor may display the second SaaS application session so that it is viewable within the UI.

20 Claims, 6 Drawing Sheets

(56) References Cited

U.S. PATENT DOCUMENTS

| | | | |
|---|---|---|---|
| 2014/0282971 A1* | 9/2014 | Gustavson | H04L 63/0815 726/7 |
| 2015/0088978 A1* | 3/2015 | Motukuru | H04L 67/02 709/203 |
| 2015/0195285 A1* | 7/2015 | Pugh | H04L 67/10 726/1 |
| 2015/0244814 A1* | 8/2015 | Khalatian | H04L 67/141 715/753 |
| 2015/0319252 A1* | 11/2015 | Momchilov | H04L 67/42 709/223 |
| 2016/0036864 A1* | 2/2016 | Ezell | H04M 7/0018 709/227 |
| 2016/0232460 A1* | 8/2016 | Gibson | G06F 16/9537 |
| 2016/0337844 A1* | 11/2016 | Hailpern | H04W 8/183 |
| 2016/0373445 A1* | 12/2016 | Hayton | G06F 21/554 |
| 2017/0054778 A1* | 2/2017 | Tornielli | H04L 67/42 |
| 2017/0093712 A1* | 3/2017 | Chopra | H04L 29/08729 |
| 2017/0099333 A1* | 4/2017 | Hartzell | G06F 9/5055 |
| 2018/0205742 A1* | 7/2018 | Vinukonda | H04L 67/02 |
| 2018/0219923 A1* | 8/2018 | Berger | H04L 69/14 |
| 2019/0028550 A1* | 1/2019 | Bowden | H04L 69/327 |
| 2019/0098096 A1* | 3/2019 | Mocanu | G06F 16/95 |
| 2019/0342314 A1* | 11/2019 | Fleck | H04L 67/141 |
| 2020/0097612 A1* | 3/2020 | Borkar | H04L 67/02 |

\* cited by examiner

CLIENT COMPUTING DEVICE PROVIDING PREDICTIVE PRE-LAUNCH SOFTWARE AS A SERVICE (SAAS) SESSIONS AND RELATED METHODS

BACKGROUND

Traditionally, personal computers include combinations of operating systems, applications, and user settings, which are each managed individually by owners or administrators on an ongoing basis. However, many organizations are now using application and/or desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server(s) may include one or more hypervisors (virtual machine managers) to create and maintain multiple virtual machines, software to manage the hypervisor(s), a connection broker, and software to provision and manage the virtual desktops. In some embodiments, a VDI server(s) may provide access to shared server-based hosted applications, as well as Web/Software-as-a-Service (SaaS) applications.

Desktop virtualization systems may be implemented using a single virtualization server or a combination of servers interconnected as a server grid. For example, a cloud computing environment, or cloud system, may include a pool of computing resources (e.g., desktop virtualization servers), storage disks, networking hardware, and other physical resources that may be used to provision virtual desktops, and/or provide access to shared applications, along with additional computing devices to provide management and customer portals for the cloud system.

SUMMARY

A client computing device may include a memory and a processor cooperating with the memory to run a first Software as a Service (SaaS) application session from a server for a first SaaS application within an embedded browser and viewable within a user interface (UI). The processor may further pre-launch a second SaaS application from the server different than the first SaaS application within the embedded browser based upon browser commands within the first SaaS application session. The second SaaS application session may be hidden so that it is not viewable within the UI. Upon user selection of the second SaaS application, the processor may display the second SaaS application session so that it is viewable within the UI.

In accordance with an example embodiment, the processor may pre-launch the second SaaS application session based upon browser search commands within the embedded browser. In accordance with another example embodiment, the client computing device may pre-launch the second SaaS application session further based upon a time of day. By way of example, one of the first and second SaaS applications may comprise a SaaS calendar application, a SaaS contact application, a SaaS electronic mail (email) application, or a SaaS customer management application.

A related method may include running a first SaaS application session for a first SaaS application from a server at a client computing device within an embedded browser, where the first SaaS application session is viewable within a UI. The method may further include pre-launching a second SaaS application session for a second SaaS application from the server at the client computing device within the embedded browser based upon browser commands within the first SaaS application session, with the second SaaS application being different than the first SaaS application, and the second SaaS application session being hidden so that it is not viewable within the UI. Furthermore, upon user selection of the second SaaS application, the method may further include displaying the second SaaS application session so that it is viewable within the UI.

A related non-transitory computer medium may include computer-executable instructions for causing a client computing device to run a first SaaS session for a first SaaS application from a server within an embedded browser, with the first SaaS application session being viewable within a UI. The non-transitory computer medium may further include instructions for pre-launching a second SaaS application session for a second SaaS application from the server within the embedded browser based upon browser commands within the first SaaS application, with the second SaaS application being different than the first SaaS application, and the second SaaS application session being hidden so that it is not viewable within the UI. Furthermore, upon user selection of the second SaaS application, the non-transitory computer-readable medium may further include instructions for displaying the second SaaS application on the display so that it is viewable within the UI.

DETAILED DESCRIPTION

Generally speaking, the present disclosure relates to an approach for providing Software as a Service (SaaS) application pre-launching to expedite user access to SaaS application sessions. As will be explained further below, this advantageously provides for an enhanced virtual computing environment with expedited SaaS application availability, allowing for improved productivity and user experience (UX).

The present description is made with reference to the accompanying drawings, in which example embodiments are shown. However, many different embodiments may be used, and thus the description should not be construed as limited to the particular embodiments set forth herein. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
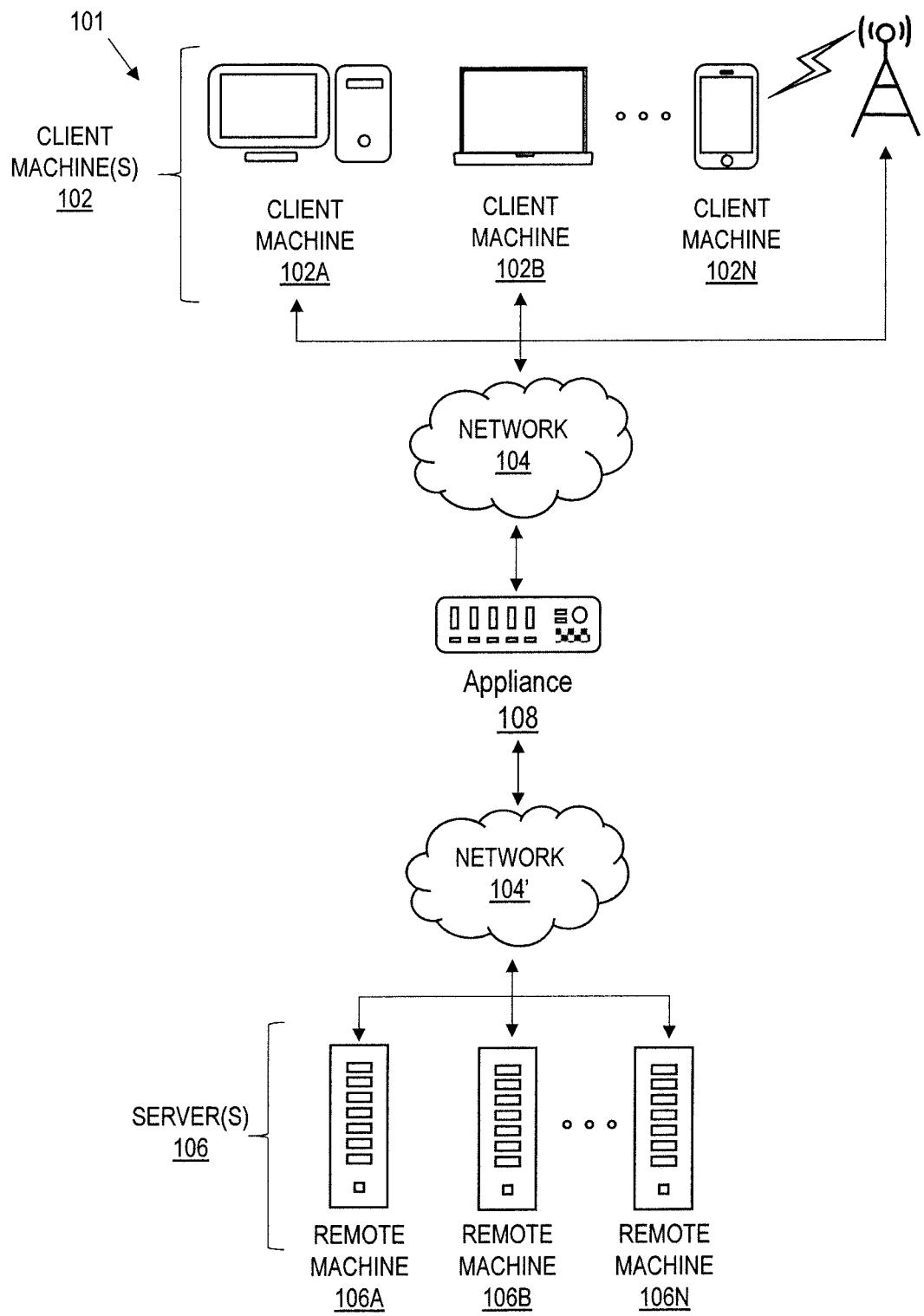
FIG. 1 is a schematic block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
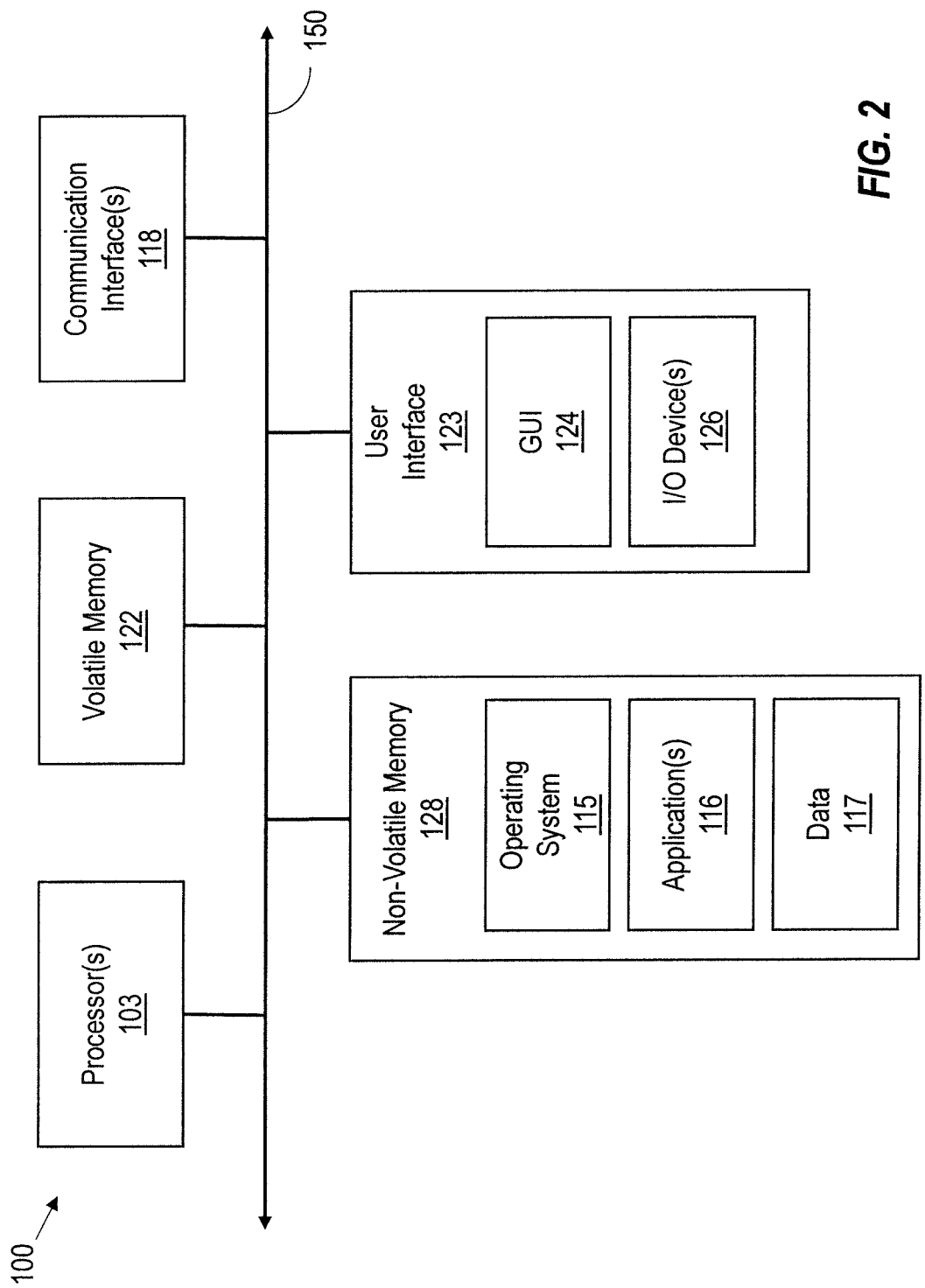
FIG. 2 is a schematic block diagram of a computing device useful for practicing an embodiment of the client machines or the remote machines illustrated in FIG. 1.

FIG. 2 depicts a block diagram of a computing device 100 useful for practicing an embodiment of client devices 102, appliances 108 and/or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 103 may be analog, digital or mixed-signal. In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
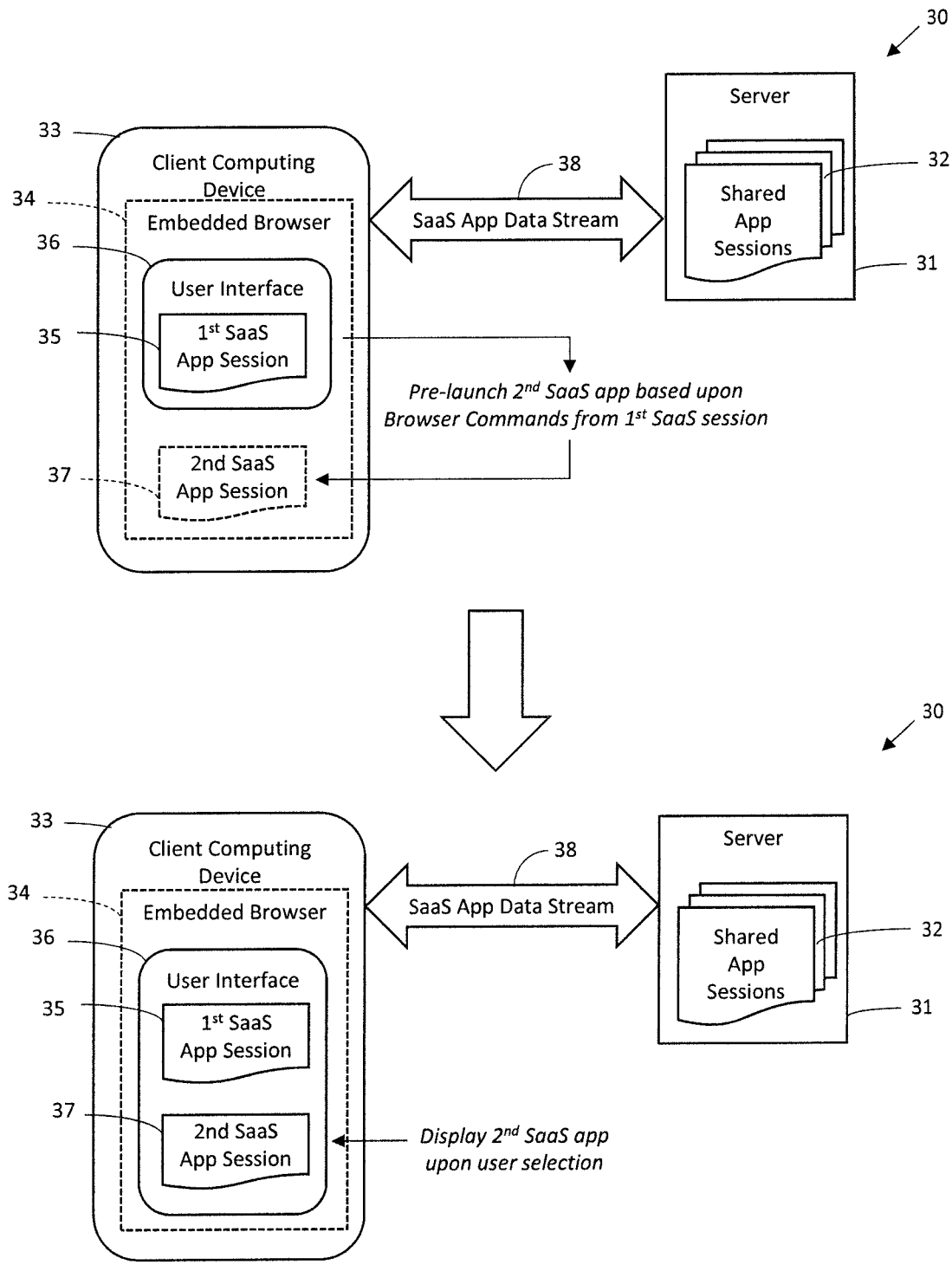
FIG. 3 is a schematic block diagram of a computing system providing Software as a Service (SaaS) application pre-launching features in accordance with an example embodiment.

Turning now to FIG. 3, a computing system 30 which advantageously provides for SaaS application pre-launching to expedite user access to SaaS application sessions, and thereby enhance user experience (UX), is first described.

The system 30 illustratively includes a server 31 configured to provide access to SaaS application sessions 32 for one or more client computing devices 33 via a SaaS application data stream 38. In some example implementations, the server 31 may be a SaaS server which interfaces directly with the client computing device 33. In accordance with another example, the computer system 30 may be implemented as a unified endpoint management (UEM) system in which the server 31 allows for centralized control of the client computing device 33 and provides an interface to a third-party SaaS provider (or provides SaaS application sessions itself). It should be noted that other configurations of the computing system 30 are also possible, such as an enterprise mobility management (EMM) configuration, for example. In accordance with one example embodiment, the server 31 may be implemented as part of a Citrix Workspace implementation in combination with Citrix Netscaler Secure Web Gateway to provide SaaS application access as discussed further below, but it will be appreciated that other systems and platforms may be used in different embodiments.

In such implementations, the server 31 allows for the enforcement of data loss prevention (DLP) and/or other security policies for user access to various applications and data, and in some instances may be implemented in conjunction with a mobile device management (MDM) agent installed on the client computing device 33. Also, the computing system 30 may utilize a mobile application management (MAM) approach, which provides enterprise control at the application level for managing and securing application data without installing an agent on the client computing device 33. By way of example, the client computing device 33 may be a desktop computer, laptop computer, tablet computer, smartphone, etc.

By way of background, currently users are required to execute a number of steps to navigate to additional SaaS applications with related content. For example, a user could start a specific task in one SaaS application and need data that has been stored in a different SaaS application. The user would then have to pause his or her work in the first SaaS application and decide which other (second) SaaS application might have that data, search their browser for the second SaaS application, open the second SaaS application, and finally search for the data in the second SaaS application. In addition, the user has to remember details of the data from the first SaaS application, such as spelling or dates, which sometimes may be challenging while switching between applications. Moreover, depending upon system usage at that time or other factors, it may take a significant amount of time to launch the second application once selected by the user. All of this may add up to a significant amount of lost productivity for users over time, in addition to a diminished UX.

However, the computing system 30 provides for the automatic pre-launch of additional relevant SaaS applications through an embedded browser responsive to actions that are being performed in a previously launched SaaS application to thereby advantageously improve productivity and UX. More particularly, the client computing device 33 cooperates with the server 31 to run the first SaaS application session 35 (which corresponds to a first SaaS application) within the embedded browser 34 so that it is viewable within a user interface (UI) 36 on a display associated with the client computing device. Based upon browser commands within the first SaaS application session 35, a second SaaS application session 37 (which corresponds to a second SaaS application different than the first SaaS application) is pre-launched within the embedded browser 34, as seen in the upper half of FIG. 3. That is, the second SaaS application session 37 remains hidden so that it is not viewable on the display within the UI 36, even though the second SaaS application is now running within the embedded browser 34. However, when a user of the client computing device 33 provides an indication or selection that she wants to begin using the second SaaS application session 37, the embedded browser 34 then causes the second SaaS application session to be viewable within the UI 36, as seen in the lower half of FIG. 3.

Figure 4:
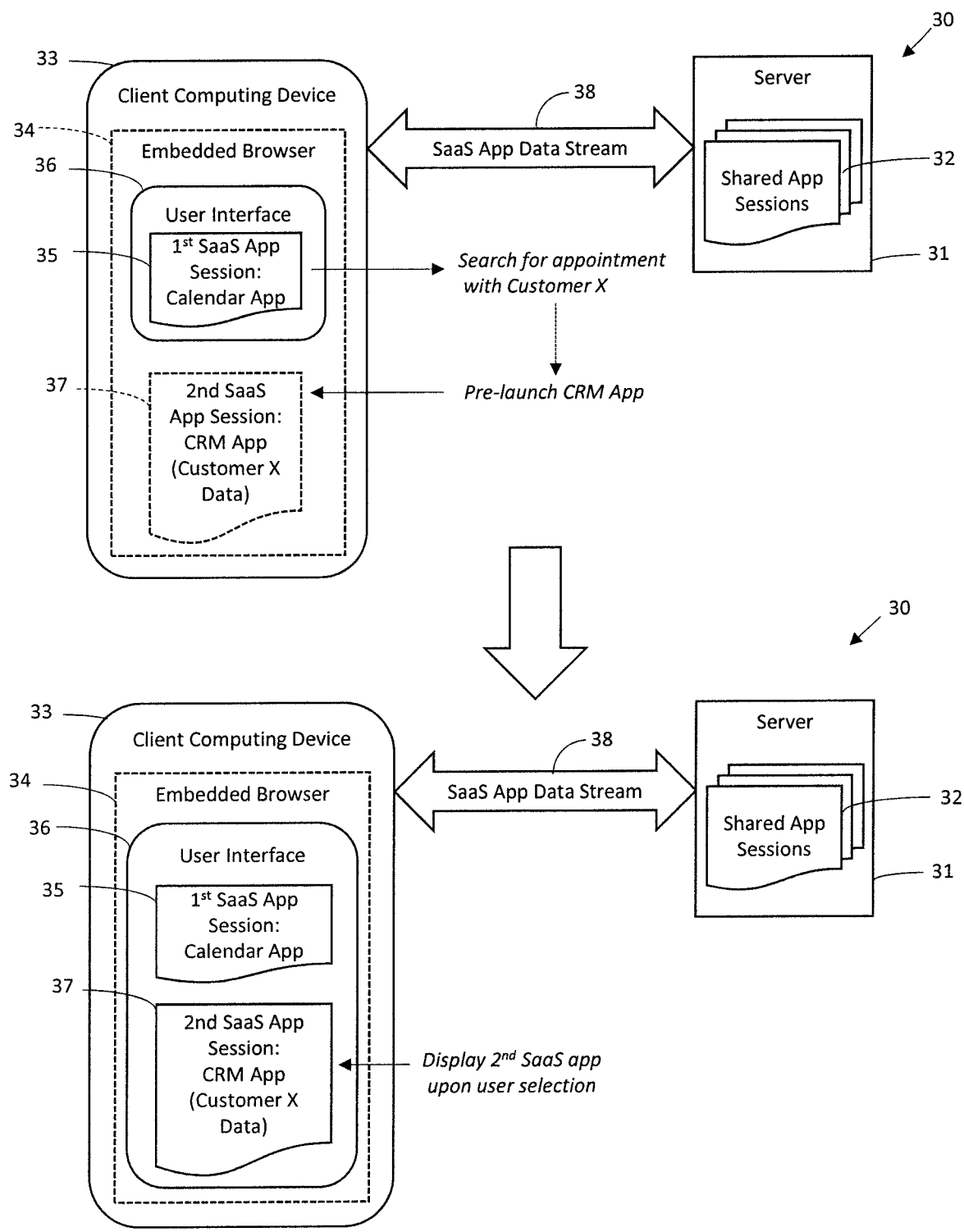
FIG. 4 is a schematic block diagram of an example use case of the computing system of FIG. 3.

The foregoing will be further understood with reference to certain example implementations, one of which is now described with reference to FIG. 4. Here, the first SaaS application session 35 corresponds to a SaaS calendar application, which is running within the embedded browser 34 and displayed in the UI 36. In this implementation, the embedded browser 34 tracks or monitors the browser commands from the first SaaS application session 35, and looks for searches pertaining to a given person or contact. For example, if the user runs a search within the calendar application session for an upcoming meeting with a given attendee (e.g., Customer X), the embedded browser 34 may accordingly cooperate with the server 31 to pre-launch the second SaaS application session 37 for a corresponding application where contact information is managed. By way of example, the second SaaS application session 37 may be launched within a hidden browser tab. In this case, the second SaaS application is a customer relationship management (CRM) SaaS application (e.g., Salesforce, etc.). Accordingly, when the user is ready to access customer information related to Customer X, upon selection of the second SaaS application session 37 the CRM SaaS application session is already up and running.

Moreover, the embedded browser 34 may optionally initiate a search within the pre-launched second SaaS application (CRM) session 37 using browser search commands for the meeting attendee that the user searched for in the first (calendar) SaaS application (i.e., Customer X). In this way, the second SaaS application session 37 is not only active and ready to use when selected by the user, it also already has the pertinent information or data on Customer X ready to display within the UI 36.

Various approaches may be used to select the second SaaS application session 37 by the user. In one example implementation, the embedded browser 34 may simply wait until the user selects an icon or quick-start button for the second application before making the second application session 37 visible within the UI 36. In other embodiments, the embedded browser 34 may provide a pop-up notification asking the user if the user would like to switch to the second application (the CRM application in this example). The pop-up may be provided immediately upon detection of the trigger within the first SaaS application session 35 or after a short delay. The delay allows the second SaaS application session 37 to be selected once it is fully opened and available for viewing within the UI, so that the user does not actually experience the startup delay that is associated with opening the second SaaS application session 37, and instead will perceive an instantaneous application launch experience.

Figure 5A:
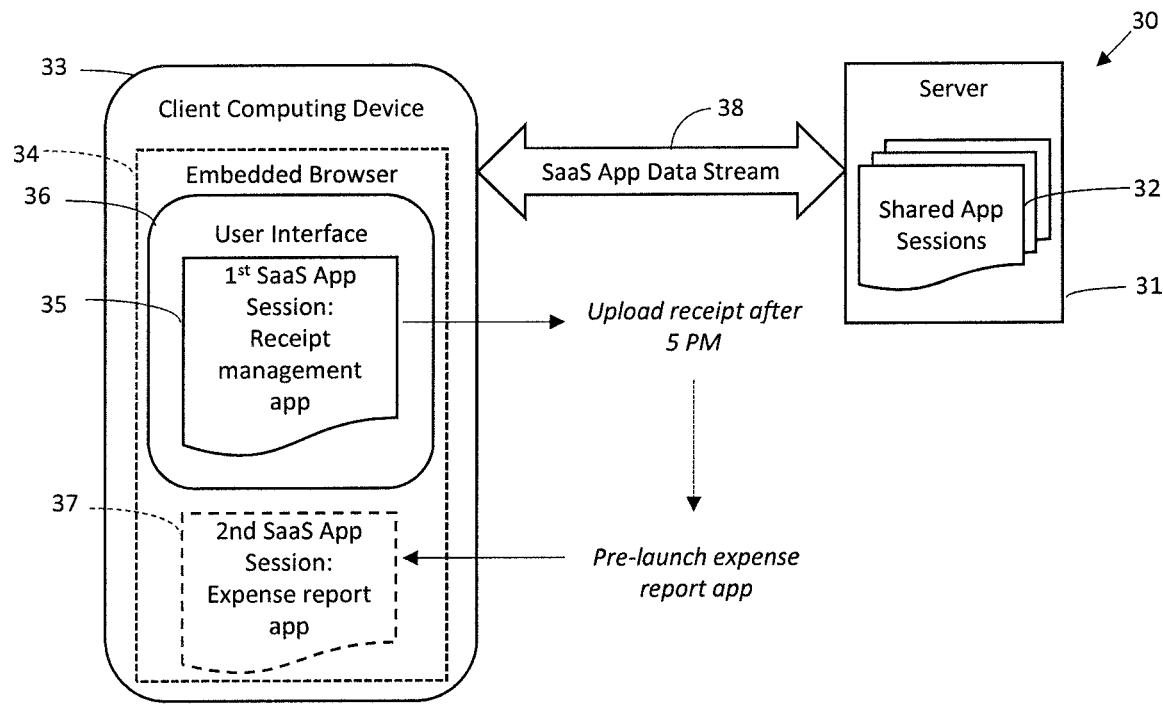
FIGS. 5A and 5B are schematic block diagrams illustrating another example use case of the computing system of FIG. 3.
Figure 5B:
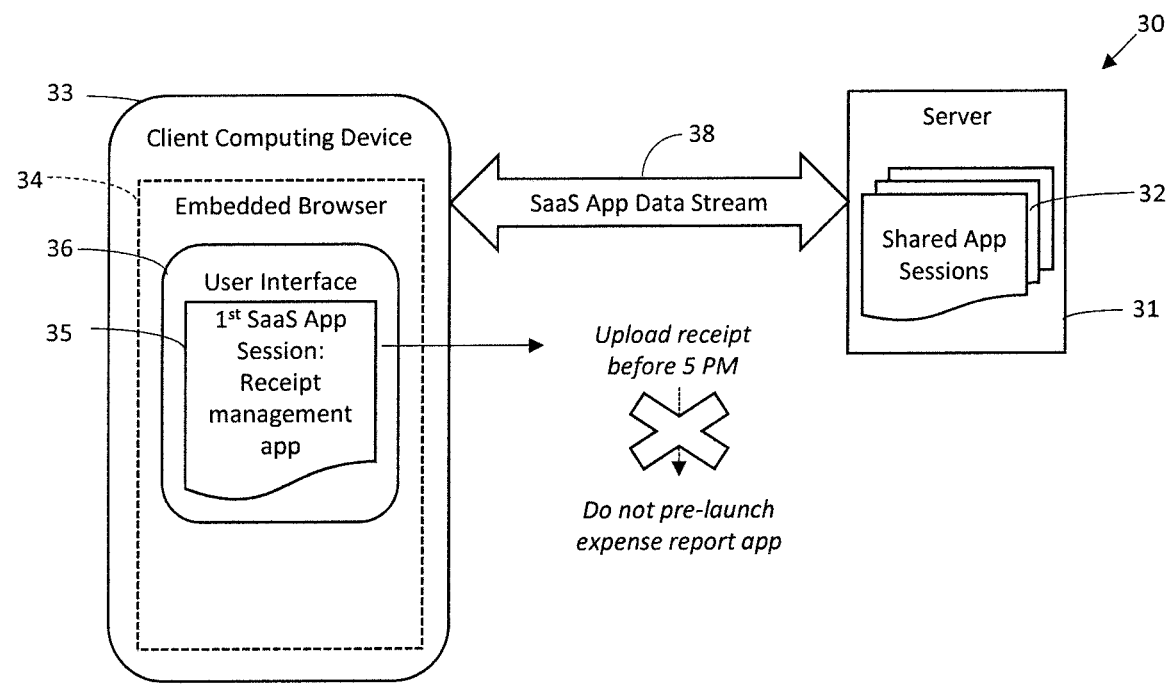

Turning now to FIGS. 5A-5B, in accordance with another example implementation, the first application is a SaaS receipt management application, and the second application is an expense reporting application. In the example of FIG. 5A, the user uploads expense receipts (such as from business travel) through the first SaaS application session 35 throughout the day. However, the embedded browser 34 may utilize two triggers for pre-launching the second SaaS application session 37, namely the uploading up an expense receipt and the time of day.

In this example, it is assumed that the user will want to submit one expense report for the entire day which includes all of the expenses the user incurred that day. As such, if the user uploads a receipt via the first SaaS application session 35 early in the morning (e.g., for breakfast), the user is likely not ready to fill out the expense report at that time, and the second SaaS application session 37 is not pre-launched (see FIG. 5B). Rather, the embedded browser waits until after a certain time of the day (here 5 PM, although other times may also be used), and if a receipt is uploaded after this time (e.g., for dinner), then the second SaaS application session 37 is pre-launched so that when the user is ready to fill out the expense report for the day, the second SaaS application session may be immediately accessed upon user selection (see FIG. 5A).

The foregoing are but a few examples of different application combinations and triggers that may be used for predictive pre-launching of SaaS applications. Examples of inputs that may be monitored by the embedded browser 34 to initiate pre-launching include agendas, calendar events, emails, usage patterns, application triggers/data points, time, uniform resource identifiers (URIs), application states, etc.

Moreover, in some embodiments the embedded browser 34 (or the server 31) may utilize machine learning or a matching algorithm to determine usage patterns in which a user(s) typically opens a second SaaS application after providing a given input or series of inputs in a first SaaS application. More particularly, the embedded browser 34 is advantageously able to analyze what is transpiring within the first SaaS application session 35 since it has access to all of the user's inputs and other contextual information (e.g., through HTTP requests, etc.). This information may then be used to trigger the pre-launching of the second SaaS application session 37, irrespective of whether the first and second applications are related or designed to work with one another. That is, the present approach may work across different SaaS application platforms and vendors, as the embedded browser 34 allows for monitoring of user input and contextual data across all of the SaaS applications running therein. As such, the system advantageously provides for an enhanced virtual computing environment with improved productivity by pre-launching relevant applications without direct user input.

Figure 6:
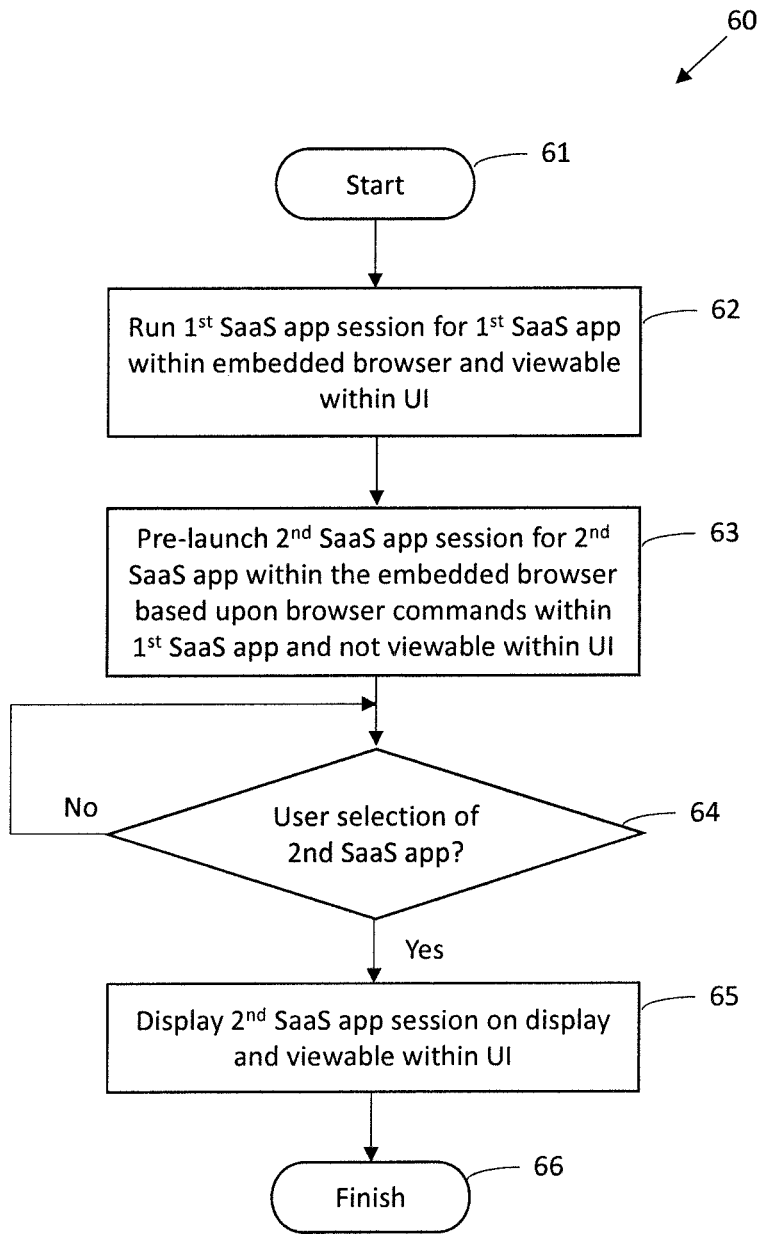
FIG. 6 is a flow diagram illustrating method aspects associated with the system of FIG. 3.

Related method aspects are now described with reference to the flow diagram 60 of FIG. 6. Beginning at Block 61, the first SaaS application session 35 for the first SaaS application is run within the embedded browser 34, which is viewable on the display within the UI 36 (Block 62). The method further illustratively includes pre-launching the second SaaS application session 37 for the second SaaS application within the embedded browser 34 based upon browser commands within the first SaaS application session 35, with the second SaaS application session being hidden (e.g., in a hidden tab) so that it is not viewable on the display within the UI 36, at Block 63. Furthermore, upon user selection of the second SaaS application (Block 64), the second SaaS application session 37 is then displayed on the display so that it is viewable within the UI 36, at Block 65, which illustratively concludes the method of FIG. 6 (Block 66).

Many modifications and other embodiments will come to the mind of one skilled in the art having the benefit of the teachings presented in the foregoing descriptions and the associated drawings. Therefore, it is understood that the foregoing is not to be limited to the example embodiments, That which is claimed is:

1. A method comprising:
   running a first Software as a Service (SaaS) application session for a first SaaS application from a server at a client computing device within an embedded browser responsive to user selection of the first SaaS application, and the first SaaS application session being viewable within a user interface (UI);
   monitoring browser commands being executed within the first SaaS application session;
   automatically pre-launching a second SaaS application session for a second SaaS application from the server at the client computing device within the embedded browser responsive to the browser commands being executed within the first SaaS application session and without user selection of the second SaaS application, the second SaaS application being different than the first SaaS application, and the second SaaS application session being hidden so that it is not viewable within the UI; and
   upon user selection of the second SaaS application, displaying the second SaaS application session so that it is viewable within the UI.

2. The method of claim 1 wherein automatically pre-launching further comprises automatically pre-launching the second SaaS application session further based upon browser search commands within the embedded browser.

3. The method of claim 1 wherein automatically pre-launching further comprises automatically pre-launching the second SaaS application session further based upon a time of day.

4. The method of claim 1 wherein one of the first and second SaaS applications comprises a SaaS calendar application.

5. The method of claim 1 wherein one of the first and second SaaS applications comprises a SaaS contact application.

6. The method of claim 1 wherein one of the first and second SaaS applications comprises a SaaS electronic mail (email) application.

7. The method of claim 1 wherein one of the first and second SaaS applications comprises a SaaS customer relationship management application.

8. A non-transitory computer-readable medium having computer-executable instructions for causing a client computing device to perform steps comprising:
   running a first Software as a Service (SaaS) application session for a first SaaS application from a server within an embedded browser responsive to user selection of the first SaaS application, and the first SaaS application session being viewable within a user interface (UI);
   monitoring browser commands being executed within the first SaaS application session;
   automatically pre-launching a second SaaS application session for a second SaaS application from the server within the embedded browser responsive to the browser commands being executed within the first SaaS application session and without user selection of the second SaaS application, the second SaaS application being different than the first SaaS application, and the second SaaS application session being hidden so that it is not viewable within the UI; and
   upon user selection of the second SaaS application, displaying the second SaaS application session so that it is viewable within the UI.

9. The non-transitory computer-readable medium of claim 8 wherein automatically pre-launching further comprises automatically pre-launching the second SaaS application session further based upon browser search commands within the embedded browser.

10. The non-transitory computer-readable medium of claim 8 wherein automatically pre-launching further comprises automatically pre-launching the second SaaS application session further based upon a time of day.

11. The non-transitory computer-readable medium of claim 8 wherein one of the first and second SaaS applications comprises a SaaS calendar application.

12. The non-transitory computer-readable medium of claim 8 wherein one of the first and second SaaS applications comprises a SaaS contact application.

13. The non-transitory computer-readable medium of claim 8 wherein one of the first and second SaaS applications comprises a SaaS electronic mail (email) application.

14. A client computing device comprising:
   a memory and a processor cooperating therewith to
      run a first SaaS application session from a server for a first SaaS application within an embedded browser responsive to user selection of the first SaaS application and viewable within a user interface (UI),
      monitor browser commands being executed within the first SaaS application session;
      automatically pre-launch a second SaaS application session from the server for a second SaaS application different than the first SaaS application within the embedded browser responsive to the browser commands being executed within the first SaaS application session and without user selection of the second SaaS application, the second SaaS application session being hidden so that it is not viewable within the UI, and
      upon user selection of the second SaaS application, display the second SaaS application session so that it is viewable within the UI.

15. The client computing device of claim 14 wherein the processor automatically pre-launches the second SaaS application session further based upon browser search commands within the embedded browser.

16. The client computing device of claim 14 wherein the processor automatically pre-launches the second SaaS application session further based upon a time of day.

17. The client computing device claim 14 wherein one of the first and second SaaS applications comprises a SaaS calendar application.

18. The client computing device claim 14 wherein one of the first and second SaaS applications comprises a SaaS contact application.

19. The client computing device claim 14 wherein one of the first and second SaaS applications comprises a SaaS electronic mail (email) application.

20. The client computing device claim 14 wherein one of the first and second SaaS applications comprises a SaaS customer relationship management application.

* * * * *